(12) United States Patent
Kohana et al.

(10) Patent No.: US 8,118,682 B2
(45) Date of Patent: Feb. 21, 2012

(54) UNIVERSAL JOINT AND METHOD FOR PRODUCTION THEREOF

(75) Inventors: Mika Kohana, Shizuoka (JP);
Yoshihide Himeno, Kuwana (JP);
Masaki Higami, Kuwana (JP)

(73) Assignee: NTN Corporation, Osaka (JP)

( * ) Notice: Subject to any disclaimer, the term of this patent is extended or adjusted under 35 U.S.C. 154(b) by 365 days.

(21) Appl. No.: 12/308,532

(22) PCT Filed: Jun. 29, 2007

(86) PCT No.: PCT/JP2007/063075
§ 371 (c)(1),
(2), (4) Date: Dec. 16, 2008

(87) PCT Pub. No.: WO2008/001880
PCT Pub. Date: Jan. 3, 2008

(65) Prior Publication Data
US 2010/0234112 A1    Sep. 16, 2010

(30) Foreign Application Priority Data

| Jun. 30, 2006 | (JP) | 2006-181717 |
| Jul. 13, 2006 | (JP) | 2006-193118 |
| May 29, 2007 | (JP) | 2007-142656 |

(51) Int. Cl.
*F16C 1/24* (2006.01)

(52) U.S. Cl. .......... 464/15; 464/906; 508/100
(58) Field of Classification Search .......... 464/7, 15, 464/904–906; 508/100, 110, 386, 583; 264/41
See application file for complete search history.

(56) References Cited

U.S. PATENT DOCUMENTS

| 5,954,587 | A | 9/1999 | Jacob et al. |
| 2002/0077186 | A1* | 6/2002 | Hosoya et al. |
| 2009/0054276 | A1 | 2/2009 | Himeno |
| 2010/0027929 | A1 | 2/2010 | Kohara |
| 2010/0099503 | A1* | 4/2010 | Kohara ............... 464/15 |

FOREIGN PATENT DOCUMENTS
DE    196 38 779 A    4/1998
(Continued)

OTHER PUBLICATIONS

Universal Joint and Driveshaft Desgn Manual, AE-7, Society of Automotive Engineers, Inc., Warrendale, PA, pp. 99-101, TJ1079. S62 1979.*

(Continued)

*Primary Examiner* — Gregory Binda
(74) *Attorney, Agent, or Firm* — Hedman & Costigan, P.C.; James V. Costigan

(57) ABSTRACT

A universal joint which retains a lubricant, is capable of suppressing the exudation of a lubricating component to a minimum amount and preventing the lubricant from scattering from an open portion when the lubricant is deformed by an external force, and a method for producing the universal joint. In the universal joint, a rotational torque is transmitted by engagement between a torque transmission member (6) and tracks (4, 5) provided on an outer member (2) and an inner member (3); the torque transmission member (6) rolls along the tracks (4, 5), thus moving in an axial direction; and a porous solid lubricant (10) is enclosed on a periphery of the torque transmission member (6). The porous solid lubricant (10) containing a lubricating component and a resin component is a solid made porous by foaming and hardening the resin component.

10 Claims, 6 Drawing Sheets

FOREIGN PATENT DOCUMENTS

| | | |
|---|---|---|
| EP | 2 105 491 A1 | 9/2009 |
| ES | 2 147 094 A1 | 8/2000 |
| FR | 2 753 754 A1 | 3/1998 |
| GB | 2 317 436 A | 3/1998 |
| JP | 05-41569 A | 2/1994 |
| JP | 06-041569 A | 2/1994 |
| JP | 06-172770 A | 6/1994 |
| JP | 08-003259 A | 1/1996 |
| JP | 09-042297 A | 2/1997 |
| JP | 10-148218 A | 6/1998 |
| JP | 11-286601 A | 10/1999 |
| JP | 11-335657 A | 12/1999 |
| JP | 11-351252 A | 12/1999 |
| JP | 2000-319681 A | 11/2000 |
| WO | WO2007/063881 | 6/2007 |

OTHER PUBLICATIONS

Universal Joint and Driveshaft Manual, AE-7, Society of Automotive Engineers, Inc., Warrendale, PA pp. 93-95, 99-101, 145 and 146, TJ1079.S62 1979.*
EP Supplementary Search Report dated Oct. 28, 2010.
PCT Search Report Dated Jul. 31, 2007.

* cited by examiner

UNIVERSAL JOINT AND METHOD FOR PRODUCTION THEREOF

TECHNICAL FIELD

The present invention relates to a universal joint (joint) in which a porous solid lubricant is enclosed and a method for producing the universal joint.

BACKGROUND ART

Generally, a lubricant is used at a sliding portion and a rotation portion of most machines represented by cars and machines for industrial use. The lubricant is classified into a liquid lubricant and a solid lubricant. Grease obtained by thickening the lubricant to have a shape retention property and a solid lubricant which holds the liquid lubricant and is capable of preventing the liquid lubricant from scattering and dropping are also known.

In recent years, technical improvement for allowing cars to have a high performance, be compact, and be lightweight has progressed. Thus there is an increase of demands for allowing a universal joint such as a constant velocity joint used to transmit driving forces of industrial machines and component parts of cars to be compact, have a high performance, and have a long life.

Because similarly to other machines, demands for allowing the universal joint to be compact and lightweight have increased, a load applied to the universal joint has become higher. In this case, it is difficult to allow the universal joint to have a sufficiently long life by lubrication with grease. Therefore it is preferable to allow the universal joint to have a long life by a simple maintenance of incorporating the solid lubricant therein.

For example, solid lubricants containing a lubricating oil or grease mixed with an ultra-high-molecular-weight polyolefin or urethane resin and a hardener therefor to hold a liquid lubricating component between molecules of the resin so that the solid lubricants have properties of exuding the lubricating component gradually (see patent documents 1 through 3) are known.

In addition, a polyurethane elastomer having self-lubricating property obtained by a reaction between polyol and diisocyanate, both of which are materials of polyurethane, in a lubricating component is known (see patent documents 4).

When these solid lubricants are solidified by enclosing them in a bearing, the lubricating oil gradually exudes therefrom. By using the solid lubricants, it is unnecessary to perform maintenance for replenishing the lubricating oil and frequently allow the bearing to have a long life in a strict environment where much water is present and environment where a strong inertial force works.

But when the above-described solid lubricant is used at a portion such as the driving portion of the constant velocity joint where an external force such as compression, flexure, and the like is repeatedly applied at a high frequency, a very large force is necessary to deform the solid lubricant in conformity to the compression, flexure, and the like or a very high stress is applied to the solid lubricant. Therefore a portion holding the solid lubricant requires a high mechanical strength. But the strength of the solid lubricant and the filling rate thereof are usually contrary to each other. Therefore it is difficult to hold the solid lubricant at a high filling rate. Thus there is a possibility of preventing the bearing from having a long life.

Therefore there is a demand for the development of a solid lubricant which can be easily used at the portion to which the external force such as compression, flexure, and the like is repeatedly applied at a high frequency. As an example of the solid lubricant for complying with such a demand, the solid lubricant consisting of an oil-containing foam in which the lubricating oil is retained in pores of the foamed flexible resin that is used by filling it in a bearing and a constant velocity joint is known (see patent documents 5).

But the solid lubricants disclosed in the patent documents 1 through 4 have a high lubricating oil-retaining performance, but lack a flexible deformability. The solid lubricant disclosed in the patent document 5 has a flexible deformability adaptable to the external force and is capable of following deformation caused by compression and flexure. But the solid lubricant has a low lubricating oil-retaining performance. Thus when the solid lubricant is used for a bearing operating in a condition of a high speed, there is a possibility that the lubricating oil is rapidly discharged from the solid lubricant and exhausted.

The above-described solid lubricant can be used in a short period of time and an airtight space. When the solid lubricant is used in a portion required to be lubricated for a long time and an open space, the lubricating oil scatters from the open portion of the solid lubricant. Thus there is a case where the supply of the lubricating oil is short. When the oil-retaining performance is low, an excess of lubricating oil is repeatedly discharged from pores and absorbed therein, thus always flowing in the space.

When an excess of the lubricating oil which has exuded from the solid lubricant contacts an exterior material such as rubber, in some cases, the exterior material may be chemically corroded or deteriorated by the lubricating oil and additives thereof.

In the method of producing the solid lubricant, many production steps are required to securely impregnate the solid lubricant with the lubricating oil and grease. Thus it is difficult to comply with the demand for the development of the solid lubricant that can be produced at a low cost.

Patent document 1: Japanese Patent Application Laid-Open No. 6-41569
Patent document 2: Japanese Patent Application Laid-Open No. 6-172770
Patent document 3: Japanese Patent Application Laid-Open No. 2000-319681
Patent document 4: Japanese Patent Application Laid-Open No. 11-286601
Patent document 5: Japanese Patent Application Laid-Open No. 9-42297

DISCLOSURE OF THE INVENTION

Problems to be Solved by the Invention

The present invention has been made to cope with the above-described problem. It is an object of the present invention to provide a universal joint which is excellent in the performance of retaining a lubricant, is capable of suppressing an exudation amount of a lubricating component to a necessary minimum amount and preventing the lubricant from scattering from an open portion when the lubricant is deformed by an external force, has a long life, costs low, and is excellent in the productivity thereof; and a method for producing the universal joint.

Means for Solving the Problems

In the universal joint of the present invention, a rotational torque is transmitted by engagement between tracks and a torque transmission member provided on an outer member and an inner member; the torque transmission member rolls along the tracks, thus moving in an axial direction; and a porous solid lubricant is enclosed on a periphery of the torque transmission member. The porous solid lubricant containing a lubricating component and a resin component as an essential component thereof is a solid matter made porous by foaming and hardening the resin component; and the universal joint includes a scattering prevention means for preventing the lubricating component from scattering from the solid matter. The above-described universal joint is a constant velocity universal joint.

The scattering prevention means is a partitioning plate provided at an open side of the outer member.

The scattering prevention means is a film formed on an end surface of the solid matter at an open side of an outer member.

The film is formed on a portion, of the solid matter, which contacts the outer member and is exposed to an open side of the outer member when the universal joint operates.

The film is formed by using a composition having above-described resin component.

The porous solid lubricant has a resin component consisting of a resin having rubber-like elasticity or rubber and has properties of exuding the lubricating component owing to deformation thereof caused by an external force.

The resin component is polyurethane resin.

An open cell ratio of the solid matter is not less than 50%.

The method of the present invention for producing the above-described universal joint includes a mixing step of obtaining a mixture by mixing components including a lubricating component and a resin component as essential components thereof with one another; a filling step of filling the mixture on a periphery of a torque transmission member before foaming and hardening of the mixture is completed; a foaming and hardening step of foaming and hardening the mixture filled on the periphery of the torque transmission member to obtain a solid matter; and a film-forming step of forming a film on an end surface of the solid matter at an open side of the outer member.

Effect of the Invention

Figure 1:
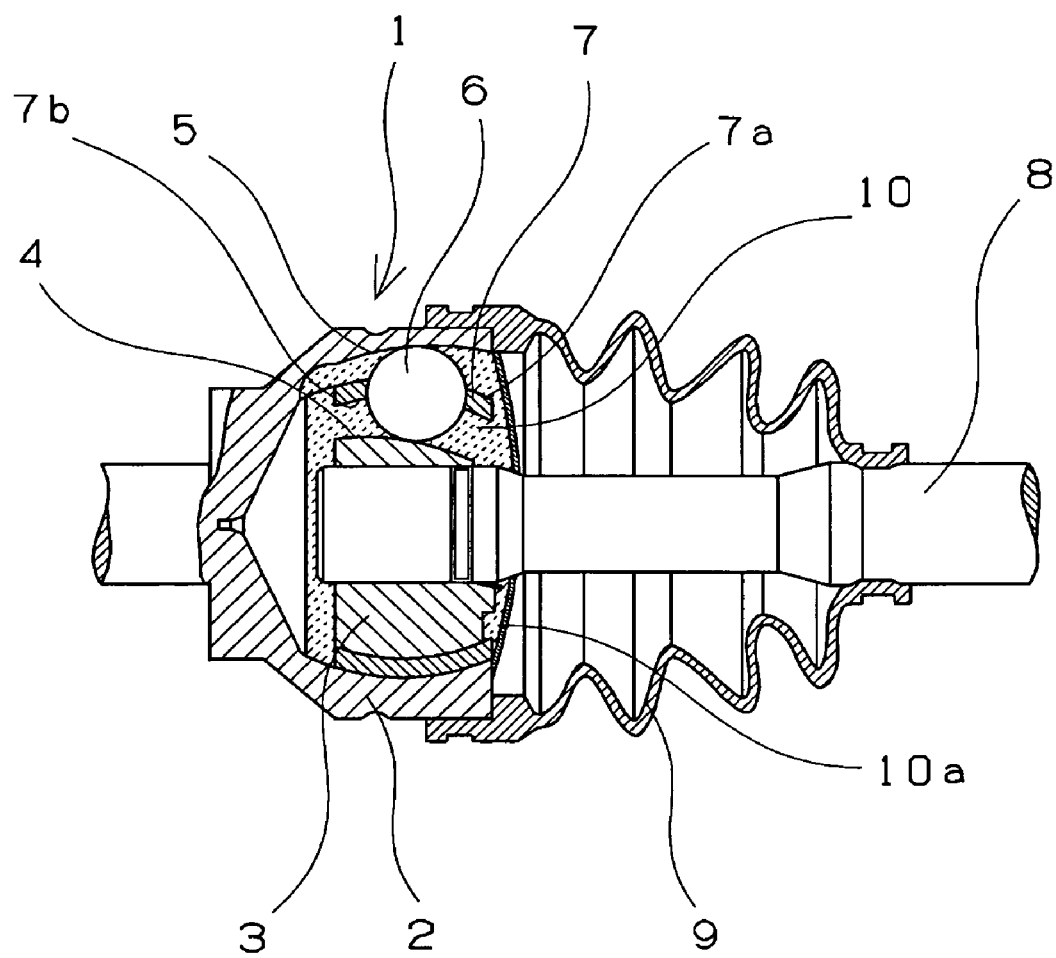
FIG. 1 is a partly cut-away sectional view of a constant velocity joint of one embodiment of the present invention.

The universal joint of the present invention uses the porous solid lubricant. The porous solid lubricant containing the lubricating component and the resin component as the essential component thereof is a solid matter made porous by foaming and hardening the resin component. The lubricating component is absorbed in the foamed and hardened solid component. As the scattering prevention means for preventing the lubricating component from scattering from the solid matter, the universal joint has the film formed on the end surface of the solid matter at the open side of the outer member and the partitioning plate provided at the open side of the outer member. Therefore in the universal joint of the present invention, the lubricating oil is gradually discharged from the porous solid lubricant to the periphery of the torque transmission member by a centrifugal force caused by a rotational motion, an external stress such as compression, flexure, expansion, and the like generated when the universal joint is displaced at a certain operating angle, and a capillarity. Further the leak of the porous solid lubricant to the open end side of the outer member can be prevented. Therefore the universal joint is excellent in its lubricant-retaining performance, can be made compact, and has a high performance and a long life.

In the present invention, "absorption" means that the lubricating component liquid or semisolid is contained in the solid resin without the lubricating component reacting with other components and without forming a compound.

By forming the film on the portion, of the solid matter, which contacts the outer member and is exposed to the open side of the outer member when the universal joint operates and at which the lubricating oil scatters and leaks in a large amount, it is possible to effectively prevent the lubricating component from scattering and leaking to the open end side of the outer member.

Because the film is formed by using the composition having the resin component of the porous solid lubricant, the film has an excellent adhesion to the porous solid lubricant. Further by adopting the resin having the rubber-like elasticity or rubber as the resin component of the porous solid lubricant and that of the film, it is possible to prevent breakage caused by compression, flexure, and the like.

The method for producing the universal joint of the present invention has the mixing step, the filling step, the foaming and hardening step, and the film-forming step. Thus it is unnecessary to enclose the lubricant in the universal joint, after the universal joint is assembled. Consequently the universal joint is produced at a high production efficiency and can be produced at a low cost.

By providing the universal joint with the scattering prevention means, it is difficult for the lubricating component to be present in a boot of the universal joint. Thus it is possible to prevent the boot from being broken owing to the expansion caused by rotation and prevent the boot from being broken and a boot band from being shifted when the universal joint is actuated at a low temperature. Therefore it is possible to improve the durability of the universal joint. In addition, when the boot is damaged, the film and the partitioning plate perform the sealing function for dust, water, and the like that penetrate into the universal joint from the outside. Thus it is possible to prevent the dust, water, and the like from penetrating into a sliding portion of the universal joint.

BEST MODE FOR CARRYING OUT THE INVENTION

The lubricating component is absorbed into the resin of the porous solid lubricant enclosed in the universal joint of the present invention. Therefore, the porous solid lubricant can be gradually discharged to the outside from gaps between molecules of the resin by exuding it owing to the flexibility of the resin, for example, owing to deformation thereof caused by an external force such as compression, expansion, flexure, and twist. In this case, the amount of the lubricating component to be exuded can be adjusted to a necessary minimum amount by changing the extent of the elastic deformation of the porous solid lubricant that is made in correspondence to the extent of the external force by the selection of the kind of the resin.

Because the resin component of the porous solid lubricant which is used in the present invention has a large surface area owing to foaming of the porous solid lubricant, an excess of the lubricating component which has exuded can be temporarily retained in bubbles of the foamed mixture. Thus the exudation amount of the lubricating component is stable. By absorbing the lubricating component in the resin and impregnating the lubricating component into bubbles, the porous solid lubricant contains the lubricating component in a larger amount in a foamed state than in the unfoamed state. Further the universal joint has the prevention means, for preventing scattering of the lubricating component, such as a film formed on the end surface of the solid matter at the open side of the outer member and the partitioning plate provided at the open side of the outer member. Therefore it is possible to prevent the lubricating component from scattering and leaking to the open side of the outer member.

In addition, the energy required by the foamed porous solid lubricant which is used in the present invention is much smaller than the unfoamed porous solid lubricant when the former bends. The foamed porous solid lubricant is capable of flexibly deforming with the lubricating component being retained therein at a high density. Further because the foamed porous solid lubricant has a large number of foamed portions, namely, porous portions, the foamed porous solid lubricant has an advantage in making the universal joint lightweight.

The porous solid lubricant which is used in the present invention is formed by only foaming and hardening the mixture containing the lubricating component and the resin component as its essential components. Thus it is unnecessary to install a particular equipment and possible to mold the mixture by filling it in a desired place.

It is possible to change the density of the porous solid lubricant by controlling the mixing amount of the components of the mixture.

As the film to be formed on the end surface of the porous solid lubricant at the open side of the outer member as the scattering prevention means of the present invention, a resin film which is formed by applying the resin composition to the end surface is preferable.

As the resin composition forming the film, in consideration of the adhesion thereof to the porous solid lubricant, it is preferable to use a resin component having a chemical affinity for the resin component composing the porous solid lubricant which will be described later. It is especially preferable that the resin composition forming the film has the same resin component as that composing the porous solid lubricant.

As the resin component composing the porous solid lubricant of the present invention, it is preferable to use a resin which has rubber-like property after the porous solid lubricant is foamed and hardened or rubber having a property of exuding the lubricating component owing to deformation of the resin component caused by an external force.

The resin component may be foamed and hardened when the resin is formed or when a mixture of the resin component and a foaming agent added thereto is molded. The "hardening" means a crosslinking reaction and/or a phenomenon in which a liquid material solidifies. The "rubber-like property" means rubber elasticity and also the restoration of a deformed material to its original configuration owing to elimination of an applied external force therefrom.

As the resin component, of resin (plastic) or rubber, it is possible to adopt an elastomer or/and a plastomer as an alloy or a copolymerizing component. It is also possible to adopt a prepolymer.

In the case of the rubber, it is possible to adopt various rubbers such as natural rubber, isoprene rubber, butadiene rubber, styrene butadiene rubber, chloroprene rubber, butyl rubber, nitrile rubber, ethylene propylene rubber, silicone rubber, urethane elastomer, fluororubber, and chlorosulfone rubber.

In the case of the plastic, it is possible to use general-purpose plastics and engineering plastics such as polyurethane resin, polyethylene resin, polypropylene resin, polystyrene resin, polyvinyl chloride resin, polyacetal resin, polyamide 4,6 resin (PA4,6), polyamide 6,6 resin (PA6,6), polyamide 6T resin (PA6T), and polyamide 9T resin (PA9T).

The resin component is not limited to the above-described plastics, but it is possible to use urethane foam such as soft urethane foam, hard urethane foam, semi-hard urethane foam; and a polyurethane elastomer.

Of the above-described resins, it is preferable to use polyurethane resin that easily foams and hardens and becomes porous.

The polyurethane resin that can be used in the present invention is a foamed and hardened matter formed by a reaction between isocyanate and polyol. It is preferable to use a foamed and hardened urethane prepolymer having an isocyanate group (—NCO) in its molecule. The isocyanate group may be blocked with other substituting groups. The isocyanate group contained in the molecules may be disposed at the termination of its molecular chain or contained at the termination of its side chain branched from the molecular chain. The urethane prepolymer may have a urethane bond in the molecular chain. A hardener for the urethane prepolymer may be polyol or polyamine.

The urethane prepolymer can be obtained by a reaction between a compound having an active hydrogen group and polyisocyanate.

As compounds having the active hydrogen group, low molecular weight polyol, polyether-based polyol, polyester-based polyol, and castor oil-based polyol are listed. These compounds can be used singly or as mixtures consisting of not less than two kinds thereof. As the low molecular weight polyol, it is possible to list bivalent low molecular weight polyols, for example, ethylene glycol, diethylene glycol, propylene glycol, 1,4-butanediol, 1,6-hexanediol, neopentyl glycol, and hydrogenated bisphenol A are listed; and trivalent or higher low molecular weight polyols (trivalent through octavalent low molecular weight polyols), for example, glycerin, trimethylol propane, hexanetriol, pentaerythritol, sorbitol, and sucrose are listed.

As the polyether-based polyols, an addition product of the low molecular weight polyol with an alkylene oxide (alkylene oxide having two to four carbon atoms, for example, ethylene oxide, propylene oxide, and butylene oxide) and polymers obtained by ring opening polymerization of the alkylene oxide are listed. More specifically, polyethylene glycol, polypropylene glycol, polytetramethylene ether glycol are listed.

As the polyester-based polyol, polyester polyol, polycaprolacton polyol, and polyether ester polyol are listed. The polyester polyol is obtained by condensation polymerization of carboxylic acid (aliphatic saturated or unsaturated carboxylic acid, for example, adipic acid, azelaic acid, dodecanoic acid, maleic acid, fumaric acid, itaconic acid, dimerized linoleic acid and/or aromatic carboxylic acid, for example, phthalic acid, isophthalic acid) and polyol (above-described low-molecular polyol and/or polyether polyol).

The polycaprolacton polyol is obtained by addition polymerization of a polymerization initiator of glycols or trials with ε-caprolacton, α-methyl-ε-caprolacton, ε-methyl-ε-caprolacton or the like under the presence of a catalyst such as an organic metal compound, a metal chelate compound, a fatty metal acyl compound or the like. The polyether ester polyol is obtained by an addition reaction between polyester having a carboxyl group and/or an OH group at its terminal and the alkylene oxide, for example, ethylene oxide, propylene oxide or the like. As the castor oil-based polyol, it is possible to list castor oil, esters formed by ester interchange between the castor oil or castor oil fatty acid and the low molecular weight polyol, the polyether polyol or the polyester polyol or esterified polyol.

As the polyisocyanate, aromatic diisocyanate, aliphatic diisocyanate or alicyclic diisocyanate, and polyisocyanate compounds are listed.

As the aromatic diisocyanate, diphenylmethane diisocyanate, 2,4-tolylene diisocyanate, 2,6-tolylene diisocyanate, and mixtures thereof, 1,5-naphthylene diisocyanate, 1,3-phenylene diisocyanate, and 1,4-phenylene diisocyanate are listed.

As the aliphatic or alicyclic diisocyanate, 1,6-hexamethylene diisocyanate, 1,12-dodecane diisocyanate, 1,3-cyclobutane diisocyanate, 1,3-cyclohexane diisocyanate, 1,4-cyclohexane diisocyanate, isopropane diisocyanate, 2,4-hexahydrotoluoylene 2,6-hexahydrotoluoylene diisocyanate, 1,3-hexahydrophenyl diisocyanate, 1,4-hexahydrophenyl diisocyanate, 2,4'-perhydrodiphenylmethane diisocyanate, and 4,4'-perhydrodiphenylmethane diisocyanate are listed.

As the polyisocyanate compound, 4,4',4''-triphenylmethane tri-isocyanate, 4,6,4'-diphenyltriisocyanate, 2,4,4'-diphenylether tri-isocyanate, and polymethylenepolyphenyl polyisocyanate are listed.

Biuret, allophanate, carbodiimide, oxazolidone, amide, imide formed by modifying a part of these isocyanates are listed.

As the urethane prepolymer preferable in the present invention, prepolymers, known as a casting urethane polymer, which are obtained by addition polymerization of polylactone ester polyol or polyether polyol with the polyisocyanate are exemplified.

It is preferable to use the urethane prepolymer obtained by addition polymerization of the polycaprolacton ester polyol obtained by a ring opening reaction of caprolacton with the polyisocyanate under the presence of short-chain polyol.

As the polyether polyol, addition products of the low molecular weight polyol with the alkylene oxide and polymers obtained by ring opening polymerization of the alkylene oxide are listed. Urethane polymers obtained by the addition polymerization of the polyisocyanate with the addition products of the low molecular weight polyol with the alkylene oxide and the polymers obtained by the ring opening polymerization of the alkylene oxide are preferable.

Exemplifying commercially available products of the urethane prepolymer that can be preferably used in the present invention, Placcel EP1130 (commercial name) produced by Daicel Chemical Co., Ltd., Coronate 4090 (commercial name) produced by Nippon Polyurethane Industry Co., Ltd, and the like are listed. The Placcel EP1130 is a white solid urethane polymer having a melting point not less than a room temperature.

As hardeners for hardening the urethane prepolymer, it is possible to use aromatic polyamines represented by 3,3'-dichloro-4,4'-diaminodiphenylmethane (hereinafter referred to as MOCA), 4,4'-diamino-3,3'-diethyl-5,5'-dimethyldiphenylmethane, trimethylene-bis-(4-aminobenzoate), bis(methylthio)-2,4-toluenediamine, bis(methylthio)-2,6-toluenediamine, methylthiotoluenediamine, 3,5-diethyltoluene-2,4-diamine, and 3,5-diethyltoluene-2,6-diamine; low molecular weight polyols represented by the above-described polyisocyanate, 1,4-butane glycol, and trimethylolpropane; polyether polyol; castor oil-based polyol; polyester-based polyol; hydroxyl terminated liquid polybutadiene; hydroxyl terminated liquid polyisoprene; hydroxyl terminated liquid polyolefin-based polyol; and liquid rubber represented by compounds, having not less than two hydroxyl groups, which are obtained by modifying the terminal hydroxyl group of the above-described compounds with an isocyanate group or an epoxy group. These compounds can be used singly or in combination. Of these compounds, the aromatic polyamine is preferable to harden the urethane prepolymer obtained by addition polymerization of the polycaprolacton ester polyol with the polyisocyanate because of the low cost and the excellence in physical properties.

In addition to the above-described resin components, it is possible to use various adhesive agents such as a urethane-based adhesive agent, a cyanoacrylate-based adhesive agent, an epoxy-based adhesive agent, a polyvinyl acetate-based adhesive agent, and a polyimide-based adhesive agent by foaming and hardening these adhesive agents.

In the present invention, various additives may be added into the resin component as necessary. As the additives, an antioxidant represented by hindered phenol-based antioxidant, a reinforcing agent (carbon black, white carbon, colloidal silica, and the like), an inorganic filler (calcium carbonate, barium sulfate, talc, clay, silica powder, and the like), an age resistor, a fire retardant, a metal inactivating agent, antistatic agent, a fungal-resistant agent, a filler, and a coloring agent.

The porous solid lubricant that is used in the present invention contains the lubricating component and the resin component as its essential components and is capable of supplying the lubricating component to the outside by an external force such as compression, flexure, a centrifugal force, expansion of bubbles caused by a rise of temperature, and the like.

To absorb the lubricating component in the resin, it is desirable to adopt a reaction-type impregnation method of simultaneously making a foaming reaction and a hardening reaction under the presence of a lubricant. Thereby it is possible to fill the lubricant in the resin to a high extent and omit to carry out an impregnation step after molding to replenish the resin with the lubricant by impregnating the lubricant thereinto.

On the other hand, only the impregnation method consisting of molding a foamed solid matter in advance and impregnating the foamed solid matter with the lubricant is incapable of permeating a sufficient amount of a liquid lubricant into the resin and thus there is not a sufficient performance of retaining the lubricant and thus the lubricant is discharged in a short period of time. Thus, in a use for a long time, it is possible that the supply of the lubricant is short. Therefore the impregnation step after molding is preferable to be adopted as an auxiliary means of the reaction type impregnation method.

Any kind of the lubricating component can be used in the present invention, provided that the lubricating component does not dissolve therein the resin component forming the foamed body. As the lubricating component, it is possible to use lubricating oil, grease, wax, and the like singly or as a mixture thereof.

As the lubricating oil, mineral oil such as paraffin oil and naphthene oil, ester-based synthetic oil, ether-based synthetic oil, hydrocarbon-based synthetic oil, GTL base oil, fluorine oil, and silicone oil are listed. These lubricating oils can be used singly or as mixed oils.

In the case where the resin material does not dissolve or disperse lubricating oil therein owing to a chemical incompatibility such as a polarity, by using another lubricating oil whose viscosity is close to that of the resin material, they can be physically easily mixed with each other. Thereby it is possible to prevent the segregation of the lubricating oil.

The grease is formed by adding a thickener to a base oil. As the base oil, the above-described lubricating oils can be listed. As the thickener, soaps such as lithium soap, lithium complex soap, calcium soap, calcium complex soap, aluminum soap, and aluminum complex soap; and urea-based compounds such as diurea compounds, polyurea compounds, and the like are listed. But the thickener is not limited to the above-described soaps and urea-based compounds.

The diurea compound can be obtained by a reaction between diisocyanate and monoamine. As the diisocyanate, phenylene diisocyanate, diphenyl diisocyanate, phenyl diisocyanate, diphenylmethane diisocyanate, octadecane diisocyanate, decane diisocyanate, and hexane diisocyanate are listed. As the monoamine, octylamine, dodecylamine, hexadecylamine, octadecylamine, oleylamine, aniline, p-toluidine, and cyclohexylamine are listed.

The polyurea compound is obtained by a reaction between the diisocyanate and the monoamine as well as diamine. The diisocyanate and the monoamine similar to those used to form the diurea compound are listed. As the diamine, ethylenediamine, propanediamine, butanediamine, hexanediamine, octanediamine, phenylenediamine, tolylenediamine, and xylenediamine are listed.

The mixing ratio of the base oil in the grease, namely, the mixing ratio of the base oil to the entire grease component is 1 to 98 wt % and preferably 5 to 95 wt %. If the mixing ratio of the base oil to the entire grease component is less than 1 wt %, it is difficult to sufficiently supply the lubricating oil to a necessary portion. If the mixing ratio of the base oil to the entire grease component is more than 98 wt %, the grease does not solidify even at a low temperature, but remains liquid.

As wax that is used in the present invention, it is possible to list hydrocarbon-based synthetic wax, polyethylene wax, fatty ester-based wax, fatty amide-based wax, ketone.amines, and hydrogen hardened oil. Oil may be mixed with these waxes. As oil components that can be used, those similar to the above-described lubricating oils can be used.

The above-described lubricating components may contain various additives including a solid lubricant such as molybdenum disulfide, graphite; a friction adjusting agent such as organic molybdenum; an oily agent such as amine, fatty acid, fats and oils; an antioxidant such as amine-based compounds and phenol-based compounds; a rust prevention agent such as petroleum sulfonate, dinonylnaphthalene sulfonate, and sorbitan ester; sulfur-based and sulfur-phosphor-based extreme pressure agents; organic zinc-based and phosphor-based wear prevention agents, a metal inactivating agent such as benzotriazole, sodium nitrite; and a viscosity index improver such as polymethacrylate, polystyrene.

As examples in which the universal joint of the present invention is utilized as a constant velocity joint, in addition to a ball-fixed joint (hereinafter referred to as BJ), an undercut free joint (hereinafter referred to as UJ) is listed. In some cases, the BJ and UJ have six or eight balls.

In enclosing the porous solid lubricant in the BJ and the UJ, a lubricant is filled in only a necessary portion thereof. Therefore the porous solid lubricant is capable of contributing to a decrease in the cost and weight of the BJ and the UJ. Further because an operating angle that is used is large, the porous solid lubricant are easily subjected to compression and flexure. Thus the lubricant is readily supplied to a sliding portion.

As examples in which the universal joint of the present invention is utilized as a sliding-type constant velocity joint, a double off-set joint, a triport joint, a cross-groove joint, and the like are listed.

As examples in which the universal joint of the present invention is utilized as a nonconstant velocity joint, a cross joint and the like are listed.

One example of the universal joint of the present invention is described below with reference to FIG. 1. FIG. 1 shows a partly cut-away sectional view showing the BJ of one example of the present invention.

As shown in FIG. 1, in a BJ1, axially extended six tracks 4, 5 are formed at an equal angle on an inner surface of an outer member (or called outer ring) 2 and an outer surface of a spherical inner member (or called inner ring) 3. A ball 6 incorporated between the tracks 4, 5 is supported by a cage 7. The periphery of the cage 7 is formed as a spherical surface 7a. The inner periphery of the cage 7 is formed as a spherical surface 7b that fits on the periphery of the inner member 3.

The periphery of the outer member 2 and that of a shaft 8 are covered with a boot 9. A porous solid lubricant 10 is enclosed in a space surrounded with the outer member 2, the spherical inner member 3, the tracks 4, 5, the ball 6, the cage 7, and the shaft 8. A film 10a is formed on an end surface of the porous solid lubricant 10 at an open side of the outer member 2.

Figure 2:
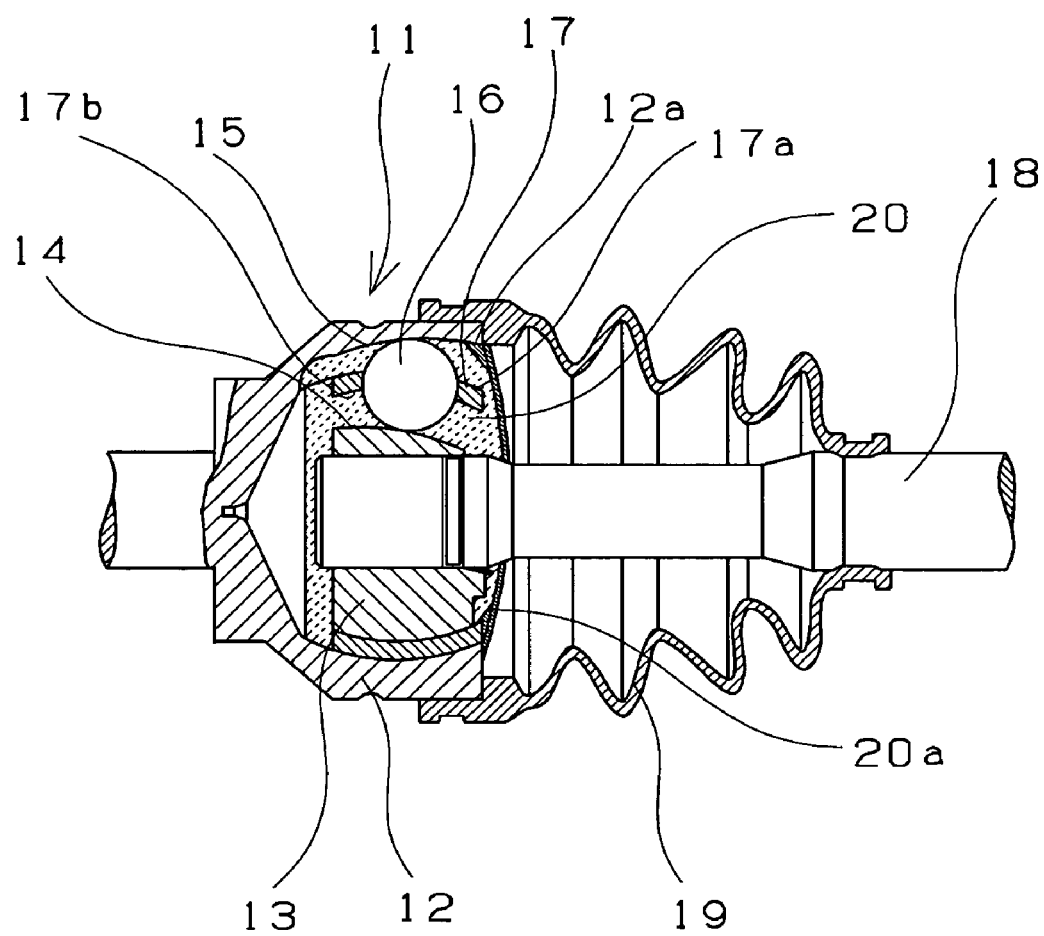
FIG. 2 is a partly cut-away sectional view of a constant velocity joint of another embodiment of the present invention.

Another example of the universal joint of the present invention is described below with reference to FIG. 2. FIG. 2 shows a partly cut-away sectional view showing the BJ of another example of the present invention.

As shown in FIG. 2, in a BJ11, axially extended six tracks 14, 15 are formed at an equal angle on an inner surface of an outer member 12 and an outer surface of a spherical inner member 13. A ball 16 incorporated between the tracks 14, 15 is supported by a cage 17. The periphery of the cage 17 is formed as a spherical surface 17a. The inner periphery of the cage 17 is formed as a spherical surface 17b that fits on the periphery of the inner member 13.

The periphery of the outer member 12 and that of a shaft 18 are covered with a boot 19. A porous solid lubricant 20 is enclosed in a space surrounded with the outer member 12, the spherical inner member 13, the tracks 14, 15, the ball 16, the cage 17, and the shaft 18. A film 20a is formed on an end surface of the porous solid lubricant 20 at an open side of the outer member 12. The film 20a is also formed on a contact portion to the outer member 12, contacting the open end 12a of the outer member, which is exposed to the open side of the outer member 12 when the BJ11 operates. At the contact portion of the outer member 12, the lubricating oil is liable to scatter and leak owing to a stress generated by the operation of the BJ11.

The method of the present invention for producing the above-described universal joint includes a mixing step of obtaining a mixture by mixing components including a lubricating component and a resin component as essential components thereof with one another; a filling step of filling the mixture on a periphery of a torque transmission member before foaming and hardening of the mixture is completed; a foaming and hardening step of foaming and hardening the mixture filled on the periphery of the torque transmission member to obtain a solid matter; and a film-forming step of forming a film on an end surface of the solid matter at an open side of the outer member.

The universal joint of the present invention is obtained by filling the mixture containing the lubricating component and the resin component as its essential components in a predetermined space of a subassembly which is assembled on only the periphery of the torque transmission member of each of the above-described various universal joints, forming the film on the end surface of the foamed and hardened solid matter at the open side of the outer member, and mounting members such as a boot on the subassembly. Because the mixture is filled in the subassembly of the universal joint and because the film is formed on the end surface of the foamed and hardened solid matter at the open side of the outer member, the mixture can be easily filled in a desired portion inside the universal joint having a complicated configuration, and the obtained universal joint is already impregnated with the lubricant. Therefore it is unnecessary to use a molding die for obtaining a foamed molding and perform an impregnating step of the lubricant after molding.

The mixing step is performed to mix the components of the mixture containing the lubricating component and the resin component as its essential components with one another. The method of mixing the components of the mixture containing the lubricating component and the resin component as its essential components with one another is not limited to a specific method, but the components of the mixture can be mixed with one another by using a stirring machine ordinarily used, for example, a Henschel mixer, a ribbon mixer, a juicer mixer or a mixing head.

It is desirable to uniformly disperse molecules of each component of the mixture by using a commercially available surface active agent such as a silicone-based foam stabilizer. Independence on the kind of the foam stabilizer, it is possible to control the surface tension so as to adjust the kind of generated bubbles to open cells or closed cells. As such a surface active agent, an anionic surface active agent, a nonionic surface active agent, a cationic surface active agent, an amphoteric surface active agent, a silicone surface active agent, and a fluorine surface active agent are listed.

The mixing ratio of the lubricating component to the entire mixture is 1 to 90 wt % and preferably 5 to 80 wt %. If the mixing ratio of the lubricating component to the entire mixture is less than 1 wt %, it is difficult to sufficiently supply the lubricating component to necessary portions. If the mixing ratio of the lubricating component to the entire mixture is more than 90 wt %, the mixture remains liquid and thus there is a case where the solid lubricant is incapable of performing its specific function.

The mixing ratio of the resin component to the entire mixture is 8 to 98 wt % and preferably 20 to 80 wt %. If the mixing ratio of the resin component to the entire mixture is less than 8 wt %, the mixture does not solidify. If the mixing ratio of the resin component to the entire mixture is more than 98 wt %, the supply amount of the lubricating component is small and thus the porous solid lubricant does not perform its function.

The mixing ratio of the hardener is determined by the mixing amount of the resin and a foaming magnification which will be described later.

The filling step is performed to fill the mixture in desired portions of the subassembly of the universal joint before the mixture foams and hardens. Because the mixture is flowable before it foams and hardens, it can be easily filled in the desired portion inside the universal joint having a complicated configuration. In filling the mixture in the desired portions inside the universal joint, the mixture can be molded in a predetermined configuration by covering a side surface of a predetermined space inside the subassembly of the universal joint with a lid by using a jig as necessary. In this case, it is possible to use a partitioning plate that is described later as the lid and use it as the partitioning plate without removing it, after the mixture foams and hardens.

The foaming and hardening step is performed to foam and harden the filled mixture containing the lubricating component and the resin component as its essential components inside the subassembly of the universal joint.

As means for foaming the resin component, known foaming means can be adopted. For example, it is possible to list a physical method of heating and vaporizing an organic solvent such as water, acetone, hexane, and the like having a comparatively low boiling point; a mechanical foaming method of blowing an inactive gas such as nitrogen or air into the subassembly from outside; and a method of using a dissolving-type foaming agent such as azobisisobutylonitrile (AIBN), azodicarbonamide (ADCA) that generate a nitrogen gas or the like while being chemically dissolved by heating treatment or optical irradiation. When a compound containing an isocyanate group having a high reactivity is used as a component of the mixture, a chemical foaming method of foaming the mixture by means of carbon dioxide generated by a chemical reaction between the isocyanate compound and water molecules may be used. This method is preferable because the method easily generates open cells.

When foaming accompanied by the above-described reaction is used, it is preferable to use a catalyst as necessary. For example, a tertiary amine catalyst and an organic metal catalyst are used. As the tertiary amine catalyst, monoamines, diamines, triamines, cyclic amines, alcohol amines, ether amines, derivatives of imidazole, and an acid block amine catalyst are listed. As the organic metal catalyst, stannous octoate, dibutyltin diacetate, dibutyltin dilaurate, dibutyltin mercaptide, dibutyltin thiocarboxylate, dibutyltin maleate, dioctyltin dimercaptide, dioctyltin thiocarboxylate, and octeate are listed. A plurality of these catalysts may be used as a mixture to adjust a balance in the reaction.

It is preferable that bubbles to be generated when the mixture is made porous by foaming at the foaming and hardening step is open cells communicating with each other so that the lubricating component is directly supplied to the outside from the surface of the resin by an external stress through the open cells. In the case of closed bubbles not communicating with one another, the whole amount of the lubricating oil contained in a solid component is temporarily kept in isolation in the closed cells. Thereby it is difficult for the lubricating oil to move between bubbles. Thus there is a case in which a sufficient amount of the lubricating oil is not supplied to the periphery of the torque transmission member when necessary.

The open cell ratio of the porous solid lubricant that is used in the present invention is favorably not less than 50% and more favorably not less than 70%. If the open cell ratio is less than 50%, the lubricating oil in the resin that has foamed and hardened and become porous is temporarily captured in the closed cells at a high rate. Thus there is a case in which the lubricating oil is not supplied to the outside when necessary.

The open cell ratio of the porous solid lubricant that is used in the present invention can be computed in a procedure described below.

(1) The porous solid lubricant that has foamed and hardened is cut to an appropriate size to obtain a specimen A. The weight of the specimen A is measured.

(2) The specimen A is cleaned with a Soxhlet apparatus for three hours (solvent: petroleum benzine). Thereafter the specimen A is left in a constant-temperature bath at 80° C. for two hours to dry an organic solvent completely. The weight of an obtained specimen B is measured.

(3) The open cell ratio is computed in a procedure described below.

Open cell ratio=(1−(weight of resin of specimen B−weight of resin of specimen A)/weight of lubricating component of specimen A)×100

The weight of each of the specimens A, B and the weight of the lubricating component are computed by multiplying the weight of the resin of each of the specimens A, B by a charge ratio of the components.

Because the lubricating component captured in the closed cells not interconnected with one another is not discharged to the outside in the Soxhlet cleaning for three hours, the weight of the specimen B is not decreased. Therefore in the above-described operation, the open cell ratio can be computed by considering that the decrease amount of the weight of the example B is caused by the discharge of the lubricating component from the open cells.

It is favorable to set the foaming magnification of the porous solid lubricant that is used in the present invention to 1.1 to 100. It is more favorable to set the foaming magnification thereof to 1.1 to 10. If the foaming magnification of the porous solid lubricant is less than 1.1, the volume of a bubble is small. Thus it is impossible for the porous solid lubricant to deform when an external stress is applied thereto. Further because the solid matter is so hard that it is incapable of deforming in conformity to the external stress. On the other hand, if the foaming magnification of the porous solid lubricant is more than 100, it is difficult for the porous solid lubricant to have a strength to such an extent that the porous solid lubricant withstands the external stress. Thus the porous solid lubricant may be damaged or destroyed.

The film-forming step is performed to form the film such as a resin film as the scattering prevention means for preventing scattering of the lubricating component on the end surface of the foamed and hardened solid matter at the open side of the outer member. The resin film is formed by using a method of applying a resin composition containing a resin and an organic solvent to the foamed and hardened solid matter and drying the resin composition to solidify it. The resin film is also formed by using a method of directly applying a thermosetting elastomer or a resin to the foamed and hardened solid matter and hardening the thermosetting elastomer or the resin by heating them or irradiating them with ultraviolet rays.

As the resin composing the resin composition, as described above, it is preferable to use a resin similar to the resin component used for the porous solid lubricant in consideration of a chemical affinity thereof for the resin component composing the porous solid lubricant. As the organic solvent, it is possible to use any desired solvent, provided that it is capable of dissolving or dispersing the selected resin component therein.

As the method for applying the resin composition to the solid matter, a method of using a brush or a spatula, a spray method, and the like can be used selectively according to the configuration of the solid matter to which the resin composition is applied. As the condition of drying and hardening the resin composition after the resin composition is applied to the solid matter, a temperature and a period of time in which the organic solvent completely vaporizes from the resin composition and the resin film can be formed should be selected.

As the method for applying the thermosetting elastomer or the resin to the solid matter, a method of using the brush or the spatula and the like can be used selectively according to the configuration of the solid matter to which the thermosetting elastomer or the resin is applied. As the condition of hardening the thermosetting elastomer or the resin after the thermosetting elastomer or the resin is applied to the solid matter, a temperature condition, an ultraviolet ray irradiation condition, a period of time, and the like where the resin film can be formed by completely hardening the elastomer or the resin used should be selected.

It is possible to form the film in close contact with the lubricant by setting a resin or a rubber sheet at the open side of the outer member of the universal joint as the film, thereafter filling the mixture in the universal joint, and thereafter foaming and hardening it. It is also possible to set the resin or the rubber sheet at the open side of the outer member of the universal joint as the film, after the mixture is filled in the universal joint and foamed and hardened.

The universal joint of the present invention can be obtained by forming the resin film and thereafter mounting predetermined members such as the boot on the subassembly of the universal joint.

As a method other than the method of filling the mixture in the subassembly of the universal joint in the above-described producing method, it is possible to use a method of incorporating the porous solid lubricant in the universal joint that has been molded by filling the mixture inside a molding die and thereafter foaming and hardening it. After the porous solid lubricant is incorporated in the universal joint, the film can be formed by using the above-described method. It is also possible to obtain the resin film-attached porous solid lubricant by inserting a resin sheet into the open side of the outer member inside a molding die as the resin and thereafter filling the mixture in the molding die, and thereafter performing integral molding.

It is also possible to use a method of foaming and hardening the mixture at a normal pressure without using the molding die. In this case, it is necessary to post-process the foamed and hardened mixture into a desired configuration by means of cutting, grinding or the like and incorporate it in the universal joint. The mixture foamed and hardened at the normal temperature may contain an insufficient content of the lubricant. Therefore in this case, it is necessary to secure a predetermined amount of the lubricant by post-impregnating the lubricant into the foamed mixture before forming the resin film.

These methods require the molding die and the processing such as the grinding and the impregnation after molding, the incorporation, and the like. Further even though the hardened foamed mixture is additionally impregnated with the lubricant, these methods have disadvantages that the foamed mixture has a low extent of lubricant-retaining performance and that the lubricant is liable to leak from the foamed mixture when the foamed mixture is handled to incorporate it in the universal joint.

As apparent from the foregoing description, in consideration of the quality, workability, and the cost, it is preferable to adopt the method of filling the mixture in the subassembly of the universal joint and foaming and hardening the mixture.

Figure 3:
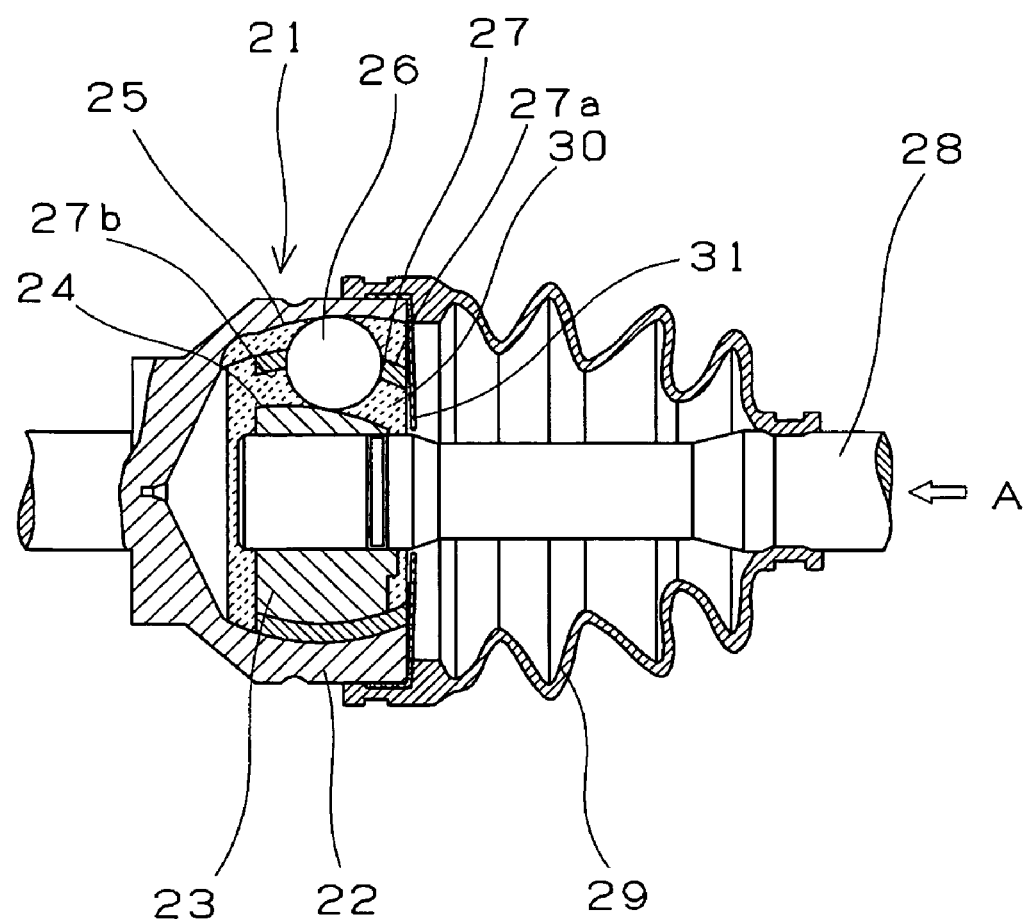
FIG. 3 is a partly cut-away sectional view of a constant velocity joint of still another embodiment of the present invention.
Figure 4:
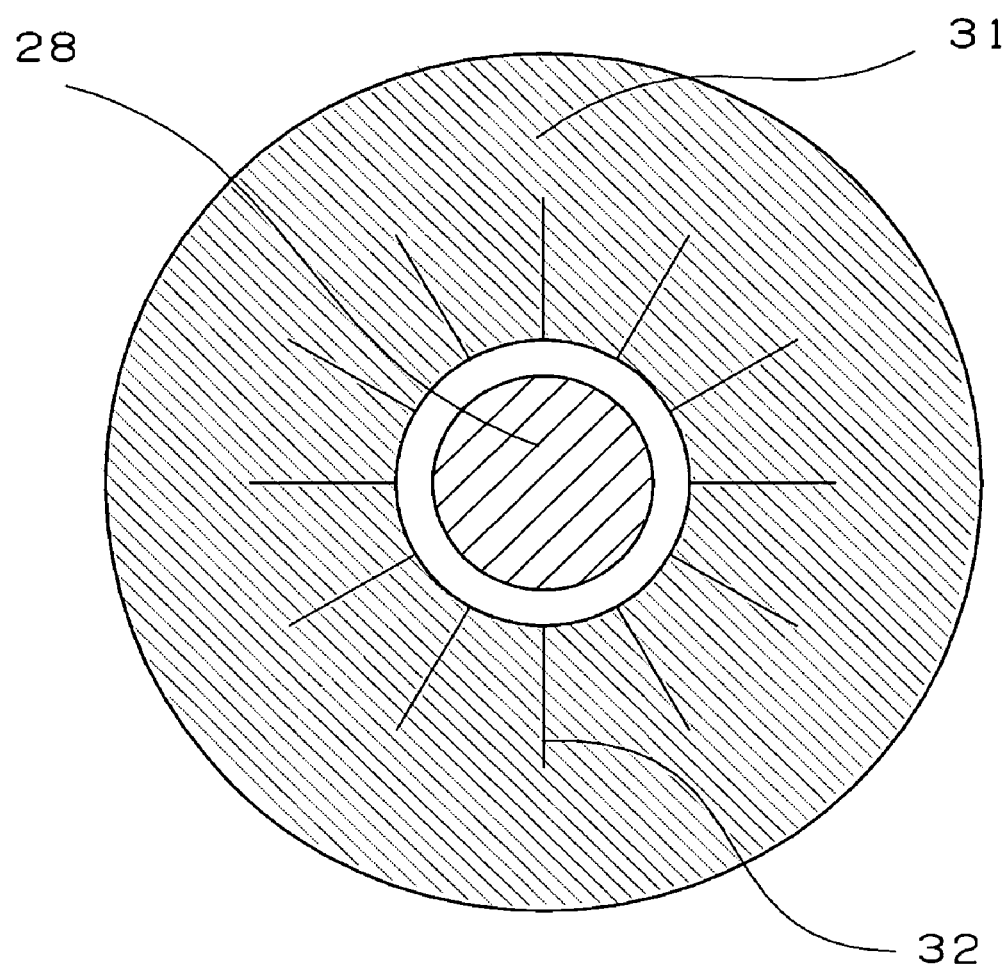
FIG. 4 shows a partitioning plate as viewed from the side of A in a state in which a boot of FIG. 3 is removed from the constant velocity joint.

Still another example of the universal joint of the present invention is described below with reference to FIG. 3. FIG. 3 shows a partly cut-away sectional view showing the BJ of still another example of the present invention. FIG. 4 shows a partitioning plate as viewed from the side of A in FIG. 3 with the boot of FIG. 3 removed from the BJ.

As shown in FIG. 3, in a BJ 21, axially extended six tracks 24, 25 are formed at an equal angle on an inner surface of an outer member 22 and an outer surface of a spherical inner member 23. A ball 26 incorporated between the tracks 24, 25 is supported by a cage 27. The periphery of the cage 27 is formed as a spherical surface 27a. The inner periphery of the cage 27 is formed as a spherical surface 27b that fits on the periphery of the inner member 23.

The periphery of the outer member 22 and that of a shaft 28 are covered with a boot 29. A porous solid lubricant 30 is enclosed in a space surrounded with the outer member 22, the spherical inner member 23, the tracks 24, 25, the ball 26, the cage 27, and the shaft 28. The shaft 28 penetrating through a partitioning plate 31 is formed at an open side of the outer member 22.

As a material for the partitioning plate 31, it is preferable to use a material having a flexibility and a rubber-like elasticity to such an extent that the material is capable of reacting smoothly to the operation of the shaft 28 when the shaft 28 penetrating through the partitioning plate 31 is displaced at a certain operating angle. Any material oil-resistant to the lubricant can be used without limitation. For example, it is possible to list elastomers and rubbers composing the porous solid lubricant. These materials can be used singly or as alloys.

Flexibility can be imparted to a thermoplastic elastomer and the rubber with the thermoplastic elastomer and the rubber keeping the strength thereof as a structure. Therefore by using the thermoplastic elastomer or the rubber at a portion to which an external stress such as compression and flexure is repeatedly applied at a high frequency, the portion follows the compression and the flexure and becomes easily deformable.

The partitioning plate 31 is produced from a material having a flexibility to such an extent that the partitioning plate 31 is capable of smoothly reacting to the operating angle of the shaft 28. If the partitioning plate 31 is incapable of smoothly complying with the operating angle of the shaft 28 by only the property of the material, by forming a notch 32 confronting the shaft 28 as shown in FIG. 4, it is possible to increase the degree of flexibility of the partitioning plate 31 so that the partitioning plate 31 is capable of smoothly reacting to the operating angle of the shaft 28.

In the universal joint of the present invention, the method of mounting the partitioning plate serving as the scattering prevention means on a necessary portion is not limited to a specific method. For example, after the mixture filled in the universal joint is foamed and hardened to obtain the porous solid lubricant, the partitioning plate can be mounted on the open side of the outer member. In another example, after the mixture is filled in the universal joint, the partitioning plate is mounted on the open side of the outer member as a lid to close the open side thereof. In this method, after the mixture is foamed and hardened, the partitioning plate can be used without removing it from the open side of the outer member.

As the scattering prevention means of the universal joint of the present invention, the film and the partitioning plate may be used in combination.

In the universal joint of the present invention, the lubricant is gradually discharged from the porous solid lubricant, and the film and the partitioning plate prevent the scattering and the leak of the lubricating component. In the conventional universal joint, grease flows out owing to breakage of the boot or the like. As a result, there is a possibility that defective lubrication occurs. On the other hand, in the present invention, the film and the partitioning plate do not directly cause shortening of the life of the universal joint and further perform a sealing function for the penetration of dust, water, and the like from the outside.

In the universal joint of the present invention, the lubricating component contained in the porous solid lubricant in an impregnated state does not rapidly exude from the porous solid lubricant, even though the foamed mixture is deformed by an external force, and the universal joint can be used by efficiently exuding the lubricating component to a sliding surface thereof. Consequently it is possible to obtain the universal joint which requires a minimum necessary amount of the lubricating component, has a long life, and does not deteriorate the boot made of rubber in a short period of time. Therefore the universal joint of the present invention can be used as a universal joint for various machines, favorably as a universal joint for cars, and more favorably as a constant velocity joint for cars.

If the flowability of the mixture is too low or too high at the porous solid lubricant-filling step, there is a case where the mixture is not filled in a frictional contact portion necessary to be lubricated, a case where the mixture is filled in an excessive amount even though the mixture is flowable, and a case where the mixture is filled in a portion such as a shaft hole of the inner member unnecessary to be lubricated. Therefore in mounting parts such as the shaft on the subassembly after the porous solid lubricant is filled in the universal joint, there is a case where it is difficult to mount parts on the subassembly because of the interruption of the porous solid lubricant filled in an excessive amount.

Particularly in filling the porous solid lubricant in an internal gap between the inner member and the outer member, it is necessary to apply the porous solid lubricant mainly on the periphery of a rolling element such as a track portion and its raceway surface. To the contrary, it is unnecessary to fill the porous solid lubricant in the shaft hole of the inner member of the universal joint. To fill an appropriate amount of the porous solid lubricant in necessary portions, it is necessary to adjust a pressure to be applied to the porous solid lubricant (mixture) and an extrusion amount thereof when the porous solid lubricant is filled therein. It is complicated and not easy to securely perform these operations.

Shown below is an example of a step, of producing the universal joint such as a constant velocity universal joint, where in filling the porous solid lubricant in the universal joint, parts to be subsequently mounted can be favorably assembled, and a proper degree of lubricating performance can be obtained without penetrating the porous solid lubricant into portions unnecessary to be lubricated.

Figure 5:
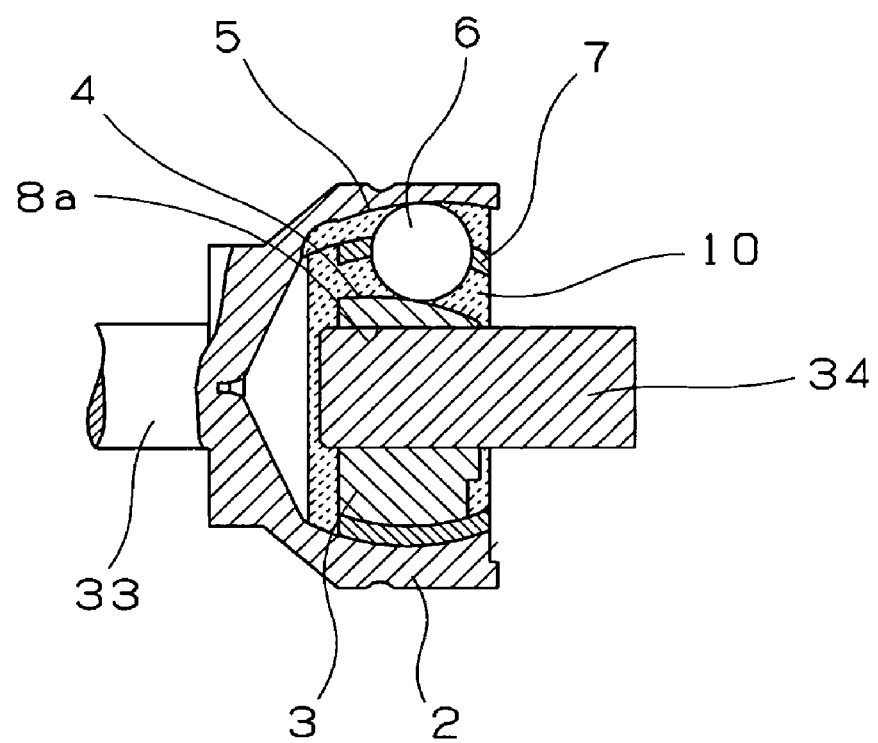
FIG. 5 is a sectional view of a constant velocity joint for showing one example of a method for producing a universal joint of the present invention.

An example of the method of producing the universal joint of the present invention is described below, based on a drawing. FIG. 5 is a sectional view of the constant velocity joint for showing the example of the method of producing the universal joint of the present invention.

As shown in FIG. 5, a universal joint of this embodiment is a ball-fixed joint (BJ). In the BJ, a plurality of axially extended tracks 4, 5 are formed on an outer surface of an inner member 3 and an inner surface of an outer member 2 with the tracks 4, 5 confronting each other. A ball 6 is supported by a cage 7 in such a way that the ball 6 is rotatably guided by the tracks 4, 5. Thereby by allowing fluctuation of an intersection angle between the shaft 8 (see FIG. 1) of the inner member 3 and a shaft 33 of the outer member 2 by the axial movement of the ball 6 on the tracks 4, 5, the rotational torque of the inner member 3 and that of the outer member 2 can be transmitted from the tracks 4, 5 through the ball 6.

In a state of the subassembly having the above-described construction before the shaft 8 (see FIG. 1) and the boot 9 of the constant velocity joint are mounted on the subassembly, the mixture which is the material of the porous solid lubricant 10 is filled in the gap between the outer member 2 and the inner member 3 from the innermost portion (front end of stopper) of a shaft hole 8a.

In filling the mixture, it is preferable to use a known quantitative determination mixing discharger (also called mixing dispenser) having a cylinder and a piston because it allows the filling amount to be easily adjusted and the operability to be high. It is preferable that immediately after the filling finishes, a stopper 34 made of synthetic resin or a rubber material is inserted into a portion of the inner member into which the shaft 8 is inserted in order to liquid-tightly seal the portion of the inner member.

The diameter of the stopper 34 is set equally to that of the shaft 8 (see FIG. 1). It is preferable that the front end portion of the stopper 34 is rod-shaped just like that of the shaft 8. As shown in FIG. 1, instead of the shaft 8, the stopper 34 liquid-tightly seals the portion of the inner member into which the shaft 8 is inserted.

It is unnecessary to limit the material for the stopper 34 to a specific one, but it is preferable to adopt a material having a favorable mold release characteristic so that the porous solid lubricant little sticks to the stopper and that the workability can be enhanced. As the material having a favorable mold release characteristic, polyethylene (PE), polyoxymethylene (POM), ethylene tetrafluoride resin (PTFE), and other fluorocarbon resins, and silicone resin are listed.

It is possible that the base material of the stopper 34 is formed of a resin or a metal and the surface of the stopper 34 is made of the fluorine-based or silicone-based resin or rubber or made of a mold release film formed by applying and dispersing a fluorine-based or silicone-based liquid mold release agent or a sprayed mold release agent, both of which are dissolved or dispersed in a volatile solvent, to the surface of the stopper 34 and drying the liquid mold release agent or the sprayed mold release. In addition, mold release films having known forms may be formed on the surface of the stopper 34 by using known methods such as plating.

As examples of the mold release film, films plated with chromium, nickel, silver, or the like; and the films made of a solid lubricant consisting of molybdenum disulfide, graphite, or the like are listed.

Because the mixture which is the material of the porous solid lubricant 10 is foamed and hardened with the stopper 34 mounted on the inner member, the pressure of the fluid is increased. Therefore the fluid favorably flows into the portion where the cage hole and the tracks are formed. Thereby the space between the inner member 3 and the outer member 2 is filled with the fluid. In this manner, the porous solid lubricant can be efficiently filled in the vicinity of the driving portion of the constant velocity joint.

When the material of the porous solid lubricant 10 is foamed in a state where the stopper 34 has not been mounted on the inner member, the amount of the porous solid lubricant 10 which flows into the portion where the cage hole and the tracks are formed is short or the porous solid lubricant 10 flows into the shaft hole 8a. Consequently at a subsequent step, there is a case in which the shaft 8 cannot be mounted on the predetermined portion.

After the stopper 34 is removed from the subassembly at a proper stage at which the foaming and hardening of the porous solid lubricant is completed, instead, the shaft 8 is inserted into the predetermined portion and mounted thereon.

At this time, as the scattering prevention means for preventing the lubricating component from scattering from the porous solid lubricant, it is preferable to provide the outer member with the partitioning plate at its open side or form the film on the end surface of the solid matter at the open side of the outer member.

Thereafter the bellows-like rubber boot 9 is mounted on the subassembly with the boot 9 covering the inner member 3, the ball 6, and the cage 7 and striding over the periphery of the shaft 8 held by the periphery of the outer member 2 and the inner member 3. Thereafter the boot 9 is fastened with a band-shaped fastening tool (so-called boot band) and the subassembly is sealed.

Figure 6:
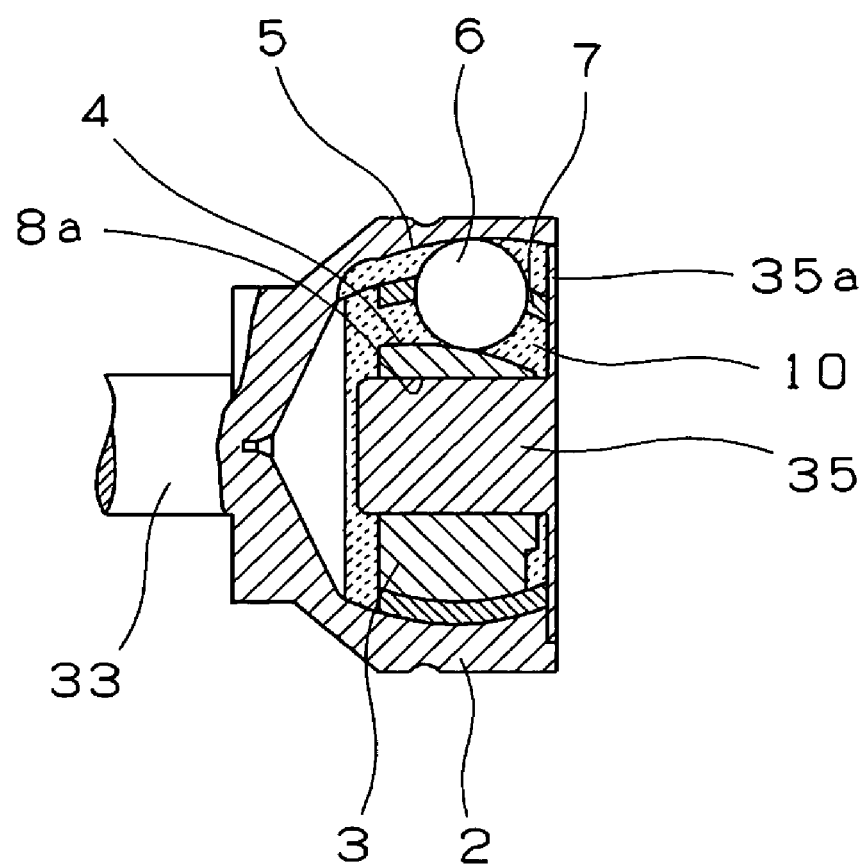
FIG. 6 is a sectional view of a constant velocity joint for showing another example of a method for producing a universal joint of the present invention.

The constant velocity joint for showing another example of the method of producing the universal joint of the present invention shown in FIG. 6 is produced by using a stopper 35 having a flange 35a whose diameter is so set as to cover the end surface of the outer member at its open side instead of the stopper 34 used in the embodiment shown in FIG. 5.

As the form of the stopper, the shaft 8 or any shaft-shaped member for sealing the shaft hole 8a of the inner member 3 can be used. For example, a member having the flange 35a covering the end surface of the outer member at its open side shown in FIG. 6 is preferable. When the end surface of the outer member at its open side is covered with the flange 35a, the porous solid lubricant does not flow out, even though not only the shaft 8a but also the gap between the inner member 3 and the outer member 2 communicates with the end surface of the outer member at its open side. By covering the end surface of the outer member at its open side in this manner, the porous solid lubricant can be efficiently filled in portions such as the gap between the inner member 3 and the outer member 2, the track portion, and the like required to be lubricated.

An air vent path may be formed on the flange 35a in the thickness direction thereof when the flange 35a covers the end surface of the outer member at its open side. More specifically, it is possible to adopt a stopper having a predetermined form having a cut-out formed on an edge of the flange, a through-hole formed therethrough in the thickness direction thereof, or a gap formed between the flange 35a and the outer member 2 by adjusting the length of the diameter of the flange or the configuration of the edge thereof. When the gap between the inner member 3 and the outer member 2 is completely sealed in filling the porous solid lubricant in the universal joint, there is no escape path for air pressed out to the outside from the gap between the inner member 3 and the outer member 2 by the porous solid lubricant expanded by foaming. When an air-stagnant portion is formed, the porous solid lubricant cannot be filled therein. By forming the air vent path, it is possible to fill the foamed porous solid lubricant in portions necessary to be filled and sufficiently lubricate the portions necessary to be filled without trapping air and a gas required for foaming the porous solid lubricant inside the flange.

A constant velocity joint in which the porous solid lubricant is enclosed can be obtained by performing an operation in a manner similar to that performed in the above-described embodiment shown in FIG. 5.

In the method for producing the universal joint shown in FIGS. 5 and 6, after the mixture which is the material of the porous solid lubricant is filled between the outer member 2 and the inner member 3 from the shaft hole 8a of the inner member 3 of the universal joint, the mixture is foamed with the shaft hole 8a sealed by the shaft 8 or the shaft-shaped stopper 34 or 35. Therefore the porous solid lubricant which is filled in portions necessary to be filled owing to the volume expansion of the mixture when the mixture is foamed becomes a uniformly pressurized fluid and is filled in a sufficient amount in the portions necessary to be lubricated. That is, the porous solid lubricant is not penetrated into portions where the lubricant is not required to be filled, but a proper amount of the porous solid lubricant can be filled in mainly the raceway (track portion) of the rolling element and the periphery thereof.

The above-described stopper prevents the porous solid lubricant from penetrating into the shaft hole and the like where it is unnecessary to be lubricated. Thus by removing the stopper from the shaft hole after the porous solid lubricant solidifies, an excess of the porous solid lubricant does not penetrate into or attach to the inside of the shaft hole. Therefore it is possible to smoothly fit the shaft of the inner member to the shaft hole and mount parts of the universal joint with a high operability.

EXAMPLES

Examples 1 and 2

At the mixing ratio shown in table 1, a urethane prepolymer serving as a resin component, a foam stabilizer, a lubricating oil, and grease were mixed considerably with one another at 80° C. After a hardener dissolved at 120° C. was added to the mixture, all the components were quickly mixed with each other. Finally a foaming agent and an amine catalyst were supplied to the mixture, and the mixture was stirred. Thereafter 17.0 g of the mixture was filled in a fixed-type eight ball joint subassembly (produced by NTN Corporation, EBJ82, size of outer diameter: 72.6 mm). In several seconds, a foaming reaction started. The mixture was left at 100° C. for 30 minutes to foam and harden the mixture. Thereafter the urethane prepolymer was kneaded considerably at 80° C. at the ratios shown at "Components of scattering prevention means and mixing amounts thereof" in table 1. After the hardener dissolved at 120° C. was added to the urethane prepolymer, both were mixed quickly with each other. Before the mixture hardened, an appropriate amount of the mixture was applied to the end surface of the porous solid lubricant at the open side of a constant velocity joint to form a scattering prevention film. Thereafter other parts including a boot and a shaft were mounted on predetermined portions to obtain a specimen constant velocity joint in which the porous solid lubricant was enclosed.

The lubricant discharge test shown below was conducted by using the obtained specimen constant velocity joint. Before and after the test was conducted, the amount of a lubricating component which moved from the porous solid lubricant enclosed inside the constant velocity joint to the boot side was measured to evaluate the movement amount of the lubricating component as the loss amount of the lubricant. Table 1 shows the results. Based on the above-described method of computing the open cell ratio, the open cell ratio of the porous solid lubricant was measured. Table 1 shows the results.

<Lubricant Discharge Test>

The lubricant discharge test was conducted by operating the specimen constant velocity joint under the following conditions: the torque load: 186 N·m, the number of rotations: 1000 rpm, the angle: six degrees, and the operation period of time: 10 hours. Before and after the test was conducted, the amount of a lubricant component which moved from the porous solid lubricant enclosed inside the constant velocity joint to the boot side was measured to obtain the loss amount of the lubricant.

Example 3

At the mixing ratio shown in table 1, a urethane prepolymer serving as a resin, a foam stabilizer, a lubricating oil, and grease were mixed considerably with one another at 80° C. After a hardener dissolved at 120° C. was added to the mixture, all the components were quickly mixed with each other. Finally a foaming agent and an amine catalyst were supplied to the mixture, and the mixture was stirred. Thereafter 17.0 g of the mixture was filled in a fixed-type eight ball joint subassembly (produced by NTN Corporation, EBJ82, size of outer diameter: 72.6 mm). Thereafter the open side of the outer member was covered with a partitioning plate (material: thermoplastic polyester elastomer, size of outer diameter: 72.6 mm, thickness: 1 mm). In several seconds, a foaming reaction started. The mixture was left at 100° C. for 30 minutes to foam and harden the mixture. Thereafter other parts including a boot and a shaft were mounted on predetermined portions to obtain a specimen constant velocity joint in which the porous solid lubricant was enclosed. Items similar to those of the example 1 were measured. Table 1 shows the results.

Comparison Examples 1 and 2

Except that the scattering prevention film was not formed, a specimen constant velocity joint was obtained in a manner similar to that of the example 1 to evaluate the loss amount of the lubricant. Table 1 shows the results.

TABLE 1

| | | Example | | | Comparison example | |
|---|---|---|---|---|---|---|
| | | 1 | 2 | 3 | 1 | 2 |
| Components of porous solid lubricant and mixing amounts thereof (wt %) | | | | | | |
| Urethane prepolymer | Placcel EP1130 (produced by Daicel Chemical Industries, Ltd) | 48 | — | 48 | 48 | — |
| Urethane prepolymer | Coronate 4090 (produced by Nippon Polyurethane Industry Co., Ltd) | — | 48 | — | — | 48 |
| Hardener | MOCA (Ihara Chemical Industry Co., Ltd) | 2.5 | 3.3 | 2.5 | 2.5 | 3.3 |
| Foaming agent | Water (ion exchange water) | 0.35 | 0.36 | 0.35 | 0.35 | 0.36 |
| Foam stabilizer | SRX298 (produced by Dow Corning Toray) | 0.25 | 0.24 | 0.25 | 0.25 | 0.24 |
| Amine catalyst | TOYOCAT DM70 (produced by Tosoh Corporation) | 0.3 | 0.24 | 0.3 | 0.3 | 0.24 |
| Lubricating oil | Turbine 100 (produced by Nippon Oil Corporation) | 36.6 | 29.86 | 36.6 | 36.6 | 29.86 |
| Grease | Pyronoc universal N6C (produced by Nippon Oil Corporation) | 12 | 18 | 12 | 12 | 18 |
| Total of mixing amounts of components | | 100 | 100 | 100 | 100 | 100 |
| Scattering prevention means | | Film | Film | Partitioning plate | — | — |
| Components of scattering prevention means and mixing amounts thereof (part by weight) | | | | | | |
| Urethane prepolymer | Placcel EP1130 (produced by Daicel Chemical Industries, Ltd) | 2 | — | — | — | — |
| Urethane prepolymer | Coronate 4090 (produced by Nippon Polyurethane Industry Co., Ltd) | — | 2 | — | — | — |
| Hardener | Ethacure 300 (produced by Albemarle Corporation) | 0.19 | 0.12 | — | — | — |
| Open cell ratio (%) | | 75 | 68 | 75 | 75 | 68 |
| Loss amount (%) of lubricant | | 8 | 8 | 8 | 20 | 17 |

As indicated in table 1, in each example of the solid lubricant-enclosed constant velocity joints provided with the scattering prevention means, the loss amount of the lubricant, namely, the amount of the lubricating component which moved to the boot side was small. Therefore the amount of the lubricating component which remained in the constant velocity joint and contributed to the lubrication was large. Thereby the life and performance of the constant velocity joint can be maintained for a long time.

Example 4

In a manner identical to the producing method of the embodiment shown in FIG. 5, a subassembly (intermediate product) of a ball joint (produced by NTN Corporation, EBJ82, size of outer diameter: 72.6 mm) where the inner member 3, the outer member 2, the cage 7, and the ball 6 were mounted was held with the shaft hole 8a of the inner member 3 turned vertically upward. Thereafter 18 g of a material (mixture) of the porous solid lubricant having the composition shown in table 2 was injected into the subassembly from the shaft hole 8a. Thereafter the stopper 34 made of PTFE was inserted into the shaft hole 8a to liquid-tightly seal the shaft hole 8a. The material was left at a room temperature for a predetermined period of time to foam and harden the material.

As a method of measuring the filling ratio (volume %), the porous solid lubricant taken out of the ball joint after the filling, foaming, and hardening was divided into a portion disposed at the shaft (hole at the center) and a portion disposed at a place other than the shaft. Thereafter the volume of the foamed mixture of the latter (sample of porous solid lubricant) was computed. More specifically, after a certain amount of a liquid (for example, water or organic solvent) was measured and put in a graduated cylinder, the sample of each specimen porous solid lubricant was immersed in the liquid. A volume $V_1$ of the foamed mixture was computed from the volume of the liquid before the sample of each specimen porous solid lubricant was immersed in the liquid and the volume thereof after the sample of each specimen porous solid lubricant was immersed therein. After a cylindrical stopper was inserted into the shaft hole of the CVJ subassembly horizontally placed, the liquid was poured therein. The volume of the liquid poured therein immediately before it dropped therefrom was set as a volume $V_2$ of the space other than the shaft. A value obtained by dividing the volume $V_1$ of the foamed mixture by the volume $V_2$ of the space other than the shaft was set as the filling ratio (volume %) for evaluation. Table 2 shows the results.

TABLE 2

| Components of porous solid lubricant and mixing amounts thereof (wt %) | | Example 4 | Example 5 | Comparison example 3 |
|---|---|---|---|---|
| Liquid rubber | Hydroxyl terminated liquid polybutadiene poly bd R45HT (produced by Idemitsu Kosan Co., Ltd.) | 28 | 28 | 28 |
| Isocyanate | Coronate T-80 (produced by Nippon Polyurethane Industry Co., Ltd) | 10 | 10 | 10 |
| Foaming agent | Water (ion exchange water) | 0.5 | 0.5 | 0.5 |
| Foam stabilizer | SRX298 (produced by Dow Corning Toray) | 0.5 | 0.5 | 0.5 |
| Catalyst | Triethylenediamine (produced by Wako Pure Chemical Industries, Ltd.) | 1 | 1 | 1 |
| Lubricating oil | Turbine oil (produced by Nippon oil corporation) | 60 | 60 | 60 |
| Total of mixing amounts of components | | 100 | 100 | 100 |
| Kind of stopper | | Stopper | Flange-attached stopper | — |
| Filling ratio (volume %) | | 96 | 100 | 70 |

Example 5

Except that the flange-attached stopper 35 was used instead of the stopper 34 of the example 4, in a manner identical to the producing method of the second embodiment shown in FIG. 6, 18 g of a material (mixture) of the porous solid lubricant having the composition shown in table 2 was injected into the subassembly from the shaft hole 8a. Thereafter the flange-attached stopper 35 made of PTFE was inserted into the shaft hole 8a to liquid-tightly seal the shaft hole 8a with a weight placed thereon. The material was left at a room temperature for a predetermined period of time to foam and harden the material.

Comparison Example 3

Except that the stopper 34 was not used and 17 g of the material of the porous solid lubricant was injected into the subassembly, the material was foamed and hardened in the same manner as that used in the example 4.

In the examples 4, 5 and the comparison example 3, the filling ratio (volume %) of the porous solid lubricant filled in each specimen ball joint, foamed, and hardened was examined.

As apparent from the results shown in table 2, in the comparison example 3 in which the method of filling the porous solid lubricant in the subassembly without using the stopper was carried out, the filling ratio was 70%. On the other hand, in the examples 4, 5 in which the method of filling the porous solid lubricant in the subassembly with using the stopper was carried out, the filling ratios were as high as 96 to 100%.

By forming the film of the example 1 on the end surface of the porous solid lubricant at the open side of the constant velocity joint in the constant velocity joints of the examples 4, 5, it is possible to fill the porous solid lubricant at a high filling ratio and prevent the lubricating component from scattering toward the boot.

INDUSTRIAL APPLICABILITY

In the universal joint of the present invention, it is possible to prevent the leak of the lubricating component to portions unnecessary to be lubricated and adjust the amount of the lubricating component to a necessary minimum amount. Further the universal joint is capable of retaining the lubricity for a long time. Therefore the universal joint can be preferably utilized for various machines for industrial use such as a wire-twisting machine, an electromotive machine, a printer, component parts of a car, an electric auxiliary machine, a construction machine, and the like and especially as the constant velocity joint for a car.

| EXPLANATION OF REFERENCE NUMERALS AND SYMBOLS | |
|---|---|
| 1, 11, 21: | constant velocity joint |
| 2, 12, 22: | outer member |
| 3, 13, 23: | inner member |
| 4, 5, 14, 15, 24, 25: | track |
| 6, 16, 26: | ball (torque transmission member) |
| 7, 17, 27: | cage |
| 7a, 17a, 27a: | spherical surface |
| 7b, 17b, 27b: | spherical surface |
| 8, 18, 28: | shaft |
| 8a: | shaft hole |
| 9. 19, 29: | boot |
| 10, 20, 30: | porous solid lubricant |
| 10a: | film |
| 20a: | film |
| 31: | partitioning plate |
| 32: | notch |
| 33: | shaft of outer member |
| 34: | stopper |
| 35: | flange-attached stopper |
| 35a: | flange |

The invention claimed is:

1. A universal joint comprising: an outer member and an inner member; a torque transmission member such that a rotational torque is transmitted by engagement between said torque transmission member and tracks provided on said outer member and said inner member and such that said torque transmission member rolls along said tracks, thus moving in an axial direction; and a porous solid lubricant that is enclosed on a periphery of said torque transmission member, wherein said porous solid lubricant contains a lubricating component and a resin component as essential components thereof and is a solid matter made porous by foaming and hardening said resin component;

wherein said porous solid lubricant is made by foaming and hardening a mixture including said lubricating component and said resin component which is filled on a periphery of said torque transmission member before foaming and hardening of the mixture is completed, wherein said lubricating component consists of lubricating oil, wax or grease and said lubricating component is dispersed in said resin component, and said resin component consists of a resin having rubber-like elasticity or rubber, wherein said porous solid lubricant has properties of exuding said lubricating component owing to deformation thereof caused by an external force; and wherein said universal joint comprises a scattering prevention means for preventing said lubricating component from scattering from said solid matter.

2. A universal joint according to claim 1, wherein said scattering prevention means is a partitioning plate provided at an open side of said outer member.

3. A universal joint according to claim 1, wherein said scattering prevention means is a film formed on an end surface of said solid matter at an open side of said outer member.

4. A universal joint according to claim 3, wherein said film is formed on a portion, of said solid matter, which contacts said outer member and is exposed to an open side of said outer member when said universal joint operates.

5. A universal joint according to claim 3, wherein said film is formed by using a composition having said resin component.

6. A method for producing a universal joint according to claim 3, comprising: obtaining a mixture by mixing components including said lubricating component and said resin component as essential components thereof with one another; filling said mixture on a periphery of said torque transmission member before foaming and hardening of said mixture is completed; foaming and hardening said mixture filled on said periphery of said torque transmission member to obtain said solid matter; and forming said film on said end surface of said solid matter at said open side of said outer member.

7. A universal joint according to claim 1, wherein said resin component is polyurethane resin or urethane elastomer.

8. A universal joint according to claim 1, wherein an open cell ratio of said solid matter is not less than 50%.

9. A universal joint according to claim 1, wherein said universal joint is a constant velocity universal joint.

10. A universal joint according to claim 1, wherein said porous solid lubricant has a closed cell in which part or said lubricating component is captured.

* * * * *